Patented Dec. 23, 1952

2,623,039

UNITED STATES PATENT OFFICE 2,623,039

THERMOSETTING KERATINOID COMPOSITIONS AND METHOD OF MAKING THE SAME

Egon Frankl, Rochester, N. Y., assignor to Rochester Button Company, Rochester, N. Y., a corporation of New York No Drawing. Application May 2, 1949,
Serial No. 91,023

5 Claims. (Cl. 260—123.7)

This invention relates to the production of thermosetting compositions from keratinous materials such as hoof, horn, feathers and the like.

It has been proposed to form heat-hardening compositions by combining keratinous materials, such as hoof substance, with heat-hardenable resinous compositions or the components thereof, such as urea or phenol and formaldehyde. However, the thermosetting characteristics of such compositions are dependent on the resin content of the composition.

I have now found that by treating the keratinous substances with a material capable of attacking the disulfide linkages of the keratin molecule, preferably in the presence of a dispersing agent, thereafter treating the keratinous substance with phosphoric acid or a phosphoric acid salt, and finally treating the phosphoric acid complex with a water-soluble calcium salt, there is produced a composition which hardens under heat and pressure into coherent translucent shapes of good strength and resistance to moisture and atmospheric influences. The addition of the calcium salt has been found to be essential to the production of a composition having thermosetting properties. The calcium salt may be any water-soluble calcium salt of inorganic or organic acids such as calcium chloride, calcium nitrate, calcium acetate and calcium lactate.

The keratinous substance, for example, hoof, may be prepared by grinding and, if desired, by bleaching, for example, with hydrogen peroxide or sodium hydrosulfite.

Suitable treating agents for use in the method of the invention are bisulfites such as sodium bisulfite, and organic mercaptan compounds, such as alkyl mercaptans, for example, ethyl mercaptan and benzyl mercaptan, and mercapto alcohols and acids, for example, β-mercapto ethanol, thioglycerol, and thioglycollic acid. Aqueous solutions of urea are advantageous dispersing agents, although other dispersing agents such as the sulfuric acid esters of long chain aliphatic compounds may be used.

While the invention is not limited to any theory of action, it is my present opinion that at least a portion of the disulfide linkages of the keratin molecule are split by the treatment with bisulfites or mercapto compounds, forming thiol or thioacid groups and that upon treatment with phosphoric acid the severed linkages are reconstituted through the phosphoric acid molecule forming a complex molecule capable of both linear and cross-linkage under heat and pressure.

The new keratinoid compositions may be molded as such but preferably they are admixed with adjuvants known to the molding art to improve their molding characteristics or to vary their appearance, such as lubricants, plasticizers, dyes, pigments, fillers and the like. Condensation catalysts such as hexamethylene tetramine may be added to the molding compositions, and other thermosetting or thermoplastic substances may be admixed therewith.

The following is a specific example illustrating the production of the heat-hardening keratinoid compositions of the invention:

100 parts by weight of ground bleached hoof is heated at 40° C. for 18 hours with a solution consisting of 600 parts of urea and 31.7 parts of sodium bisulfite in 1,000 parts of water, adjusted to pH 7.0 with triethanolamine. To the dispersion thus obtained is added phosphoric acid to pH 4.2, the reaction mixture is diluted with approximately an equal volume of water, and filtered after standing overnight.

The filter cake is washed with water, then stirred up with 1000 parts of water and 9.07 parts of calcium lactate is added. After two hours' stand the suspension is brought to pH 6.0 with triethanolamine and 10.5 parts of disodium phosphate is added. After two further hours the suspension is filtered and the filter cake is washed with water and dried.

The dried material obtained by the foregoing method sets to a tough, translucent mass under heat and pressure. The following are typical molding compositions and procedures:

1. 10 parts of the dried material is blended with 1 part of Turkey red oil. When molded at 275° F. for 2½ minutes the molded article came hard and slightly translucent from the hot mold.

2. 10 parts of the dried material is blended with 1 part of hexamethylene tetramine 0.4 part of triethanolamine, and 0.5 parts of Turkey red oil. It molds to a hard translucent article in 2 minutes at 275° F.

3. 16 parts of the dried material, 4 parts of melamine-formaldehyde molding resin, 1 part of Turkey red oil, 0.6 part of hexamethylene tetramine and 0.5 part of triethanolamine are blended together. A hard translucent article is formed by molding at 275° F. for 2 minutes.

The keratinoid material produced by the method of the invention can also be extruded and subsequently indurated by treatment with formaldehyde similar to casein. For example, a blended mixture of 30 parts of the dry material, 9 parts of water, 3 parts of Turkey red oil and 1 part of triethanolamine can be extruded at 110 to 115°

F. into a translucent rod, which can be machined into articles and cured by treatment with 3½% formaldehyde solution.

This application is a continuation-in-part of my application Serial No. 722,074 filed January 14, 1947, which has become abandoned.

I claim:

1. Method of making a heat-hardenable molding composition which comprises subjecting a hoof meal to the action of an aqueous solution of a substance capable of splitting the disulfide linkage of the keratin of the group consisting of alkali metal bisulfites and organic mercapto compounds in the presence of a dispersing agent, and treating the resulting material in aqueous dispersion successively with phosphoric acid and a water soluble calcium salt.

2. Method of making a heat hardenable molding composition which comprises subjecting hoof meal to the action of an aqueous solution of an alkali metal bisulfite, and treating the resulting material in aqueous dispersion successively with phosphoric acid and a water soluble calcium salt.

3. Method of making a heat-hardenable molding composition which comprises subjecting hoof meal to the action of an aqueous solution of an alkali metal bisulfite, in the presence of a dispersing agent and treating the resulting material in aqueous dispersion successively with phosphoric acid and a water soluble calcium salt.

4. A molding composition setting to a hard translucent mass under heat and pressure comprising the reaction product of phosphoric acid and a water soluble calcium salt reacted successively with an aqueous dispersion of the reaction product of a hoof meal and an aqueous solution of a substance capable of splitting the disulfide linkage of the keratin of the group consisting of alkali metal bisulfites and organic mercapto compounds.

5. A molding composition setting to a hard translucent mass under heat and pressure comprising the reaction product of phosphoric acid and a water soluble calcium salt reacted successively with an aqueous dispersion of the reaction product of hoof powder and an aqueous solution of an alkali metal bisulfite.

EGON FRANKL.

REFERENCES CITED

The following references are of record in the file of this patent:

UNITED STATES PATENTS

| Number | Name | Date |
|---|---|---|
| 2,261,094 | Speakman | Oct. 28, 1941 |
| 2,413,983 | Lustig et al. | Jan. 7, 1947 |
| 2,434,688 | Evans | Jan. 20, 1948 |